(12) United States Patent  (10) Patent No.: US 8,278,883 B2
Dalby  (45) Date of Patent: Oct. 2, 2012

(54) LOAD ANGLE MEASUREMENT AND POLE SLIP DETECTION

(75) Inventor: Denis Hedley Dalby, Oakham (GB)

(73) Assignee: Cummins Generator Technologies Limited, Stamford, Lincolnshire (GB)

( * ) Notice: Subject to any disclaimer, the term of this patent is extended or adjusted under 35 U.S.C. 154(b) by 633 days.

(21) Appl. No.: 12/527,809

(22) PCT Filed: Feb. 7, 2008

(86) PCT No.: PCT/GB2008/000446
§ 371 (c)(1),
(2), (4) Date: Sep. 15, 2009

(87) PCT Pub. No.: WO2008/102105
PCT Pub. Date: Aug. 28, 2008

(65) Prior Publication Data
US 2010/0039077 A1  Feb. 18, 2010

(30) Foreign Application Priority Data

Feb. 19, 2007 (GB) .................................. 0703190.9

(51) Int. Cl.
*H02P 9/00* (2006.01)
(52) U.S. Cl. ........................................... 322/20; 322/37
(58) Field of Classification Search .................. 322/10, 322/20, 22, 23, 24, 37, 99
See application file for complete search history.

(56) References Cited

U.S. PATENT DOCUMENTS

| | | | |
|---|---|---|---|
| 4,953,052 A | 8/1990 | Cartlidge et al. | |
| 5,068,590 A * | 11/1991 | Glennon et al. | 322/10 |
| 5,140,245 A | 8/1992 | Stacey | |
| 5,321,308 A * | 6/1994 | Johncock | 290/40 C |
| 5,418,446 A * | 5/1995 | Hallidy | 322/28 |
| 5,461,293 A | 10/1995 | Rozman et al. | |
| 5,493,200 A * | 2/1996 | Rozman et al. | 322/10 |
| 5,850,138 A * | 12/1998 | Adams et al. | 322/68 |
| 6,844,707 B1 * | 1/2005 | Raad | 322/29 |
| 7,843,175 B2 * | 11/2010 | Jakeman et al. | 322/28 |
| 2004/0085051 A1 | 5/2004 | Kim et al. | |
| 2005/0216225 A1 | 9/2005 | Anghel et al. | |

FOREIGN PATENT DOCUMENTS

GB  1 285 875  8/1972

OTHER PUBLICATIONS

International Search Report of PCT/GB2008/000446, dated Aug. 11, 2008. Written Opinion of the International Searching Authority of PCT/GB2008/000446, dated Aug. 11, 2008.
Written Opinion of the International Preliminary Examining Authority of PCT/GB2008/000446, dated Feb. 2, 2009.
European Search Report of Application No. GB 0703190, dated Jun. 19, 2007.

* cited by examiner

*Primary Examiner* — Nicholas Ponomarenko
(74) *Attorney, Agent, or Firm* — Hamre, Schumann, Mueller & Larson, P.C.

(57) ABSTRACT

Apparatus for measuring load angle in a synchronous generator is disclosed. The synchronous generator is of a type comprising a main machine, an exciter for exciting the main machine, and a permanent magnet machine for exciting the exciter. The apparatus comprises means for sensing a waveform produced by the permanent magnet machine, means for sensing a waveform produced by the main machine, and means (20) for comparing the waveform produced by the permanent magnet machine with the waveform produced by the main machine to produce a measure of load angle. The measure of load angle may be used to provide a warning of potential pole slip.

14 Claims, 3 Drawing Sheets

LOAD ANGLE MEASUREMENT AND POLE SLIP DETECTION

Figure 1:
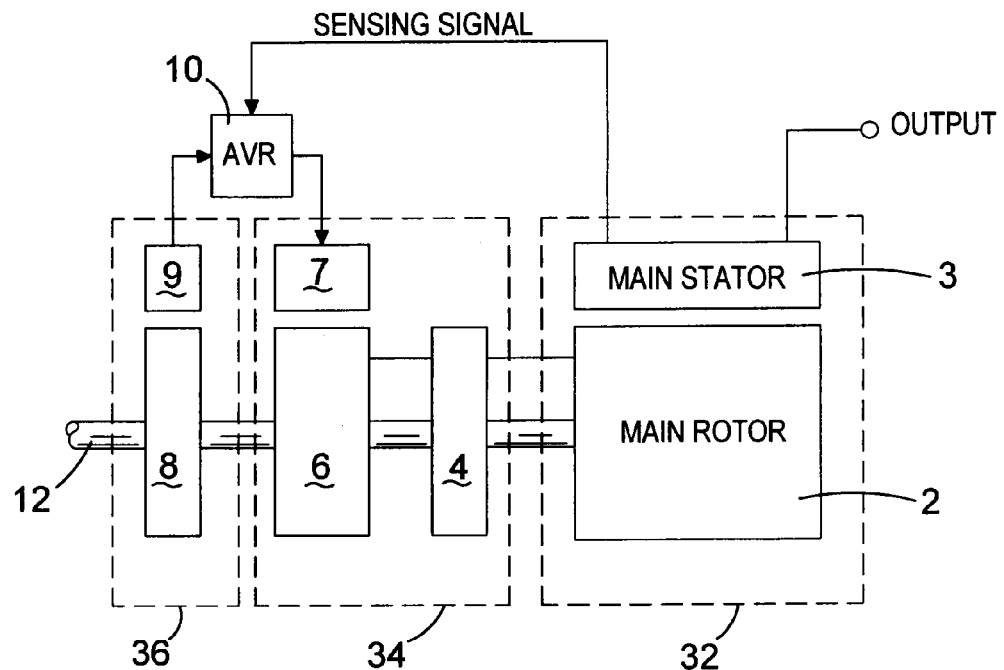

The present invention relates to a method of and apparatus for measuring load angle and/or detecting pole slip in a synchronous generator.

Synchronous generators operate by rotating a magnetic field produced by a rotor relative to windings in a stator in order to generate an AC output in the stator windings. The rotor's magnetic field is produced by passing a DC current through windings in the rotor. This DC current may be generated by an exciter mounted on the shaft of the generator. Some synchronous machines include a Permanent Magnet Generator (PMG) to power the exciter. The PMG usually has a rotating magnet assembly fitted to the shaft, and a stationary stator winding.

Synchronous generators are frequently connected to the mains utility supply network. Sudden step changes in the network voltage may result in the generator being transiently over-excited or under-excited until its control system has corrected for the change. Correction is not immediate due to inertia in the system; for example the time constant of the rotor may be in the order of seconds on generators above 1000 kVA.

Under-excited synchronous generators running in parallel with the mains utility supply produce a leading power factor. If the generator excitation becomes too weak for a particular kW loading condition, the magnetic flux in the main rotor will not develop the required torque to maintain the generator in synchronism, and the rotor will start to pole slip. Similar conditions arise for large voltage dips. This is a potentially damaging condition for the generator/prime mover and should be avoided.

Generator operating charts show the limitations of leading and lagging power factors at different kW loading levels. For parallel running generators, the lagging power factor performance is generally determined by the thermal limit of the main rotor. The leading power factor performance is determined by how close the generator is to the threshold of pole slipping.

In a synchronous generator the load angle can be used as a measure of how close the generator is to pole slipping. The load angle is the angular displacement of the generator's rotor from the no-load position. The load angle increases with increasing load and under-excitation.

A difficulty in measuring load angle is that the rotor generally has no position sensors. Therefore usual methods of load angle measurement involve the measurement of complex generator stator parameters, such as impedance or reverse VAR (volt-amperes reactive). There is therefore a need to provide a fast acting, low cost technique for load angle measurement and/or pole slip detection, with a wide operating voltage range.

According to a first aspect of the present invention there is provided apparatus for measuring load angle in a synchronous generator, the synchronous generator comprising a main machine, an exciter for exciting the main machine, and a permanent magnet machine for exciting the exciter, the apparatus comprising:
  means for sensing a waveform produced by the permanent magnet machine;
  means for sensing a waveform produced by the main machine; and
  means for comparing the waveform produced by the permanent magnet machine with the waveform produced by the main machine to produce a measure of load angle.

The present invention may provide the advantage that, by comparing the waveform produced by the permanent magnet machine with the waveform produced by the main machine, a measure of load angle may be produced relatively easily, without the need to measure complex generator stator parameters or to provide position sensors for the rotor. The invention may also provide the advantage that at least some existing components may be used for measuring load angle, which may allow a relatively simple and low cost solution to the problem of measuring load angle and/or detecting pole slip conditions.

Load angle may be used as an indication of how close the generator is to pole slip. Thus the apparatus may further comprise means for providing an indication of pole slip based on the measure of load angle. The indication of pole slip may be, for example, an indication of how close the generator is to pole slip, or an indication of whether pole slip is about to occur or is occurring. The indication of pole slip may be simply the measure of load angle.

In a synchronous generator with a permanent magnet machine, the voltage produced in the permanent magnet machine stator may be derived directly from rotating magnets fixed to the shaft. Thus the phase of the signal produced by the permanent magnet machine may provide a measure of load angle. Thus the comparing means may be arranged to compare the phase of the waveform produced by the permanent magnet generator with the phase of the waveform produced by the main machine. In this way an indication of pole slip and/or a measure of load angle may be determined without the need for position sensors to sense the position of the rotor.

In some generators the permanent magnet machine's frequency may be a multiple (or fraction) of the generator frequency. The apparatus may therefore further comprise means for changing the frequency of at least one of the waveform produced by the permanent magnet machine and the waveform produced by the main machine, preferably such that the two waveforms have substantially the same frequency. For example, the apparatus may comprise means for dividing the frequency of the waveform produced by the permanent magnet machine.

In order to compare the two waveforms, it may be desirable for the waveforms to have fast rise and/or fall times. Thus the apparatus may further comprise means for converting at least one of the waveform produced by the permanent magnet machine and the waveform produced by the main machine to a waveform having a faster rise time and/or fall time. For example, the apparatus may comprise means for converting at least one of the waveforms to a waveform which is substantially a square wave.

The apparatus may further comprise means for phase shifting at least one of the waveform produced by the permanent magnet machine and the waveform produced by the main machine so that the waveforms have a predetermined phase relationship when the generator is at a no-load condition. For example, the waveforms may be arranged to be in phase when the generator is at a no-load condition. In this way a deviation of the load angle from the no-load condition may be easily detected.

The apparatus may further comprise means for producing an output signal when the measure of load angle or indication of pole slip exceeds a predetermined threshold. For example, an alarm signal may be output when the measure of load angle or indication of pole slip exceeds the predetermined threshold. In this way, an operator may be alerted before a critical condition is reached, or the appropriate action may be taken to avert a critical condition. A number of different thresholds may be set, in order to provide a number of different warning before a critical condition is reached.

As mentioned above, the load angle may give an indication of how close the generator is to pole slip, and thus the load angle may be used to anticipate a possible pole slip condition. Thus the apparatus may further comprise means for anticipating pole slip based on the measure of load angle, and for outputting a signal indicating potential pole slip.

A change in the value of load angle may also indicate that the generator may be close to pole slip. Thus the means for anticipating pole slip may be arranged determine a change in the load angle, and to output a signal indicating potential pole slip if the change in the load angle is above a threshold. For example, the means for anticipating pole slip may be arranged to determine a rate of change of the load angle, and to output a signal indicating potential pole slip if the rate of change of the load angle is above a threshold. The means for anticipating pole slip may be arranged to differentiate the load angle signal, or to measure the difference in the load angle signal at two or more points, or to provide some other measure of how the load angle is changing.

A combination of different measures may be used to anticipate a possible pole slip condition. For example, the means for anticipating pole slip may be arranged to anticipate pole slip based on both the value of the load angle and a change in the value of the load angle. For example, the means for anticipating pole slip may determine that pole slip is imminent if the rate of change of load angle is above a threshold, and the absolute value of the load angle is above a threshold. Two or more thresholds may be set for the value of the load angle and/or the change in the value of the load angle. Various combinations of threshold may be used to anticipate possible pole slip in different ways. Various different thresholds may also be set to indicate different levels of likelihood of pole slip.

The apparatus may further comprise means for producing an alarm signal when the means for anticipating pole slip outputs a signal indicating potential pole slip.

The apparatus may further comprise means for at least partially isolating the generator from a load or a supply network in dependence on the measure of load angle or indication of pole slip. For example, the generator may be at least partially isolated from the load or supply network when the measure of load angle exceeds a predetermined threshold. In this way it may be possible to prevent or to reduce excessive currents flowing to or from the generator when pole slip occurs or is close to occurring. For example, the apparatus may further comprise means for limiting the current drawn from the generator in dependence on the measure of load angle.

The apparatus for measuring load angle may be part of an automatic voltage regulator (AVR) for a synchronous generator, or it may be a separate unit. The present invention thus extends to an automatic voltage regulator for a synchronous generator comprising the apparatus for measuring load angle described above. The invention also extends to a generator comprising a main machine, an exciter for exciting the main machine, and a permanent magnet machine for exciting the exciter, the generator further comprising the apparatus for measuring load angle or the automatic voltage regulator described above.

The generator may be drive by any type of prime mover, such as an engine, a gas turbine or a wind turbine.

According to another aspect of the invention there is provided apparatus for providing a warning of pole slip in a synchronous generator, the synchronous generator comprising a main machine, an exciter for exciting the main machine, and a permanent magnet machine for exciting the exciter, the apparatus comprising:

means for sensing a waveform produced by the permanent magnet machine;
means for sensing a waveform produced by the main machine; and
means for comparing the waveform produced by the permanent magnet machine with the waveform produced by the main machine to produce a warning of pole slip.

Corresponding methods may also be provided, and thus, according to another aspect of the invention, there is provided method of measuring load angle in a synchronous generator, the synchronous generator comprising a main machine, an exciter for exciting the main machine, and a permanent magnet machine for exciting the exciter, the method comprising the steps of:

sensing a waveform produced by the permanent magnet machine;
sensing a waveform produced by the main machine; and
comparing the waveform produced by the permanent magnet machine with the waveform produced by the main machine to produce a measure of load angle.

According to a further aspect of the invention there is provided a load angle measurement unit which measures load angle in a synchronous generator, the synchronous generator comprising a main machine, an exciter for exciting the main machine, and a permanent magnet machine for exciting the exciter, the load angle measurement unit comprising:

a first sensor which senses a waveform produced by the permanent magnet machine;
a second sensor which senses a waveform produced by the main machine; and
a comparator which compares the waveform produced by the permanent magnet machine with the waveform produced by the main machine to produce a measure of load angle.

Any of the apparatus features may be provided as method features and vice versa.

Figure 2:
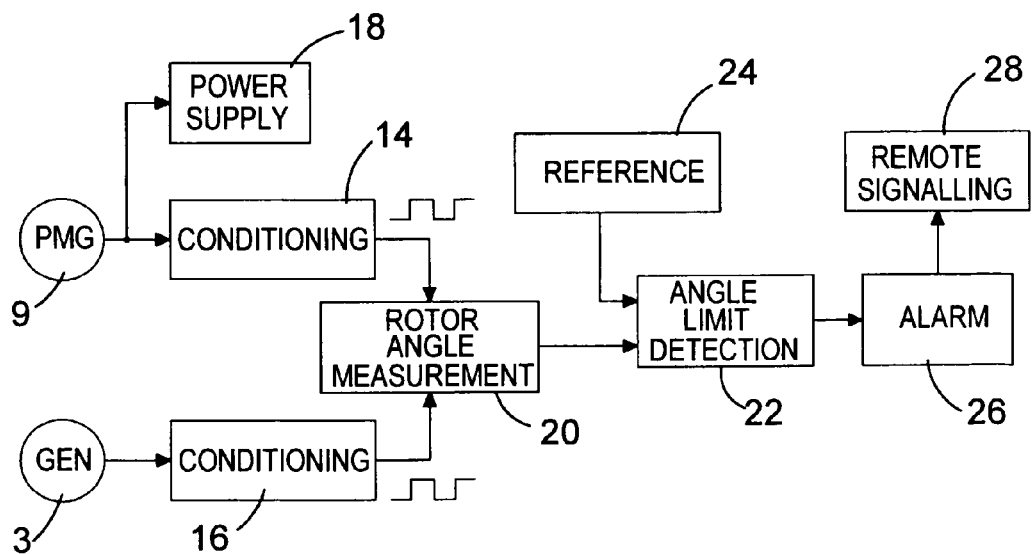
Figure 3:
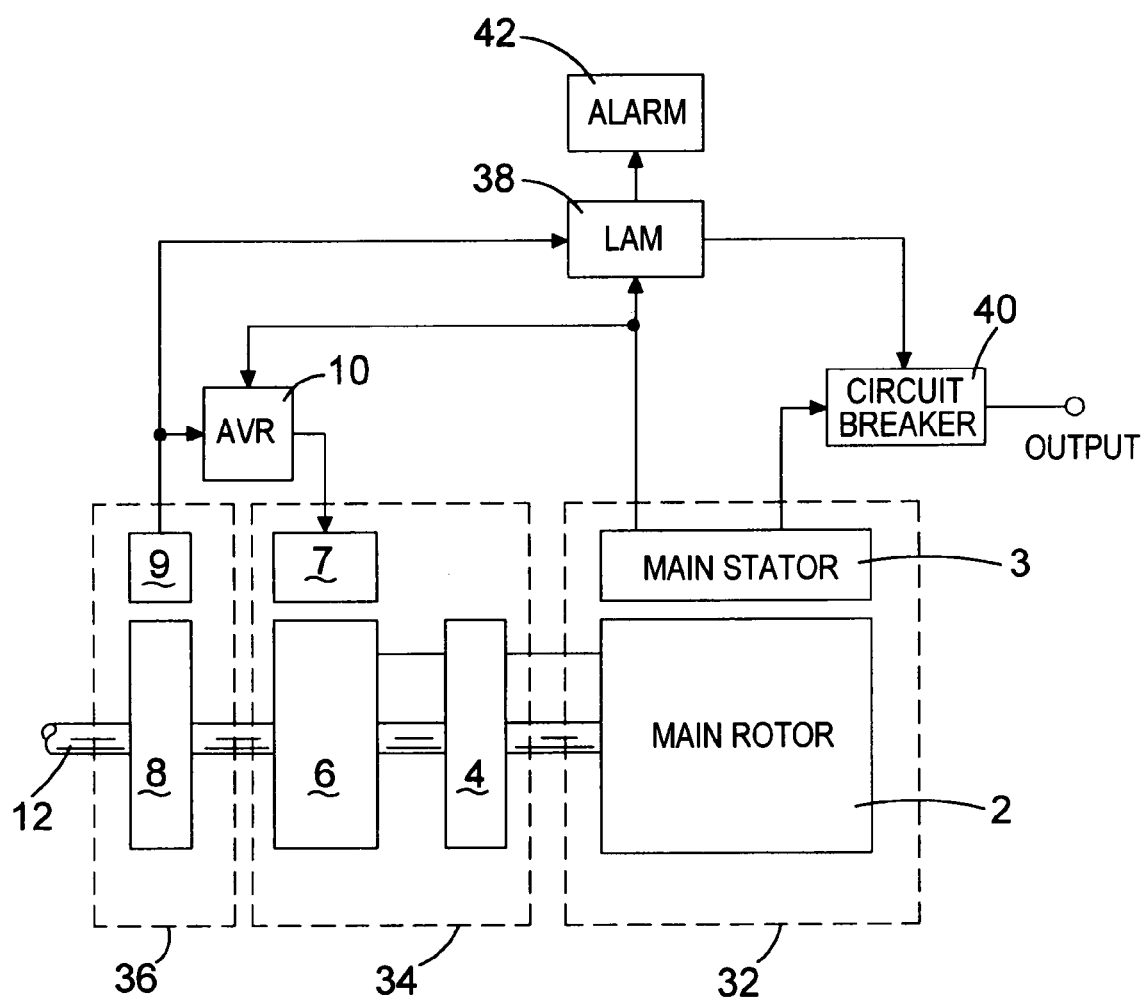
Figure 4:
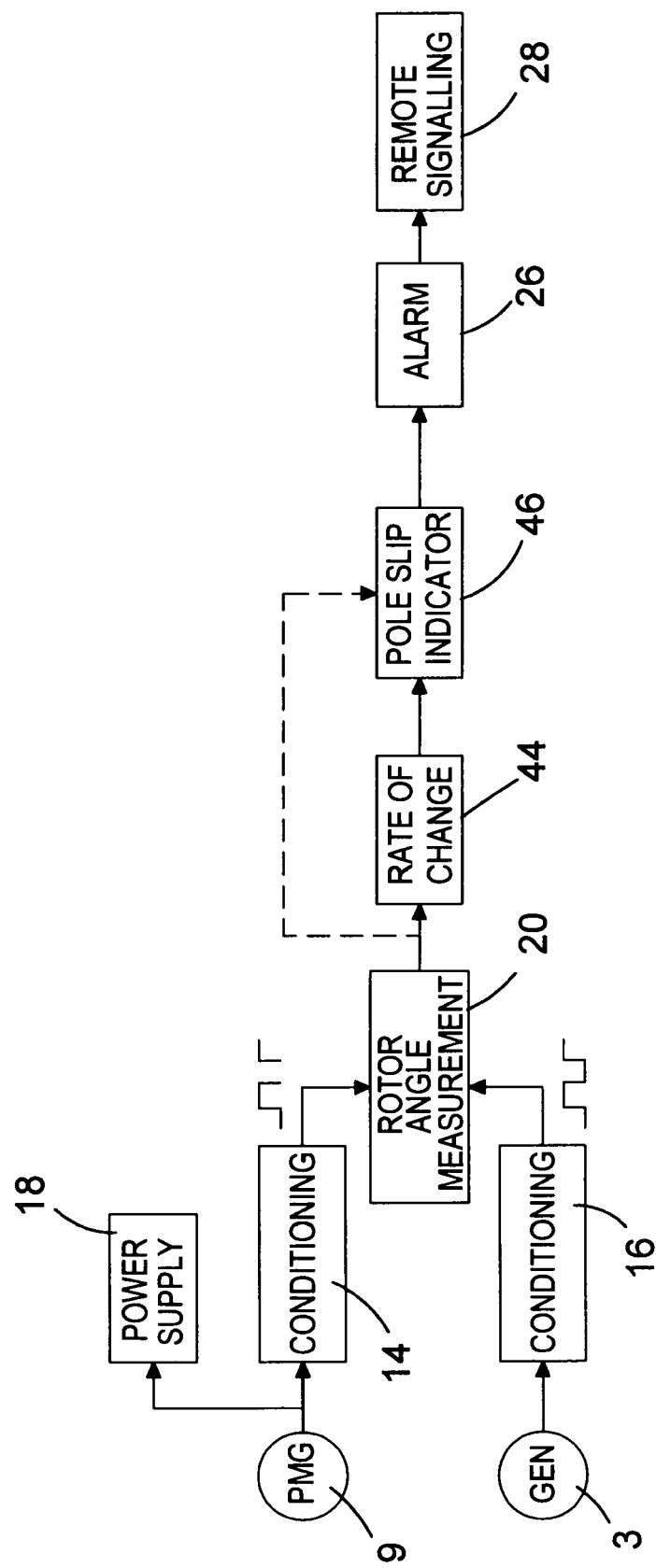

Preferred features of the present invention will now be described, purely by way of example, with reference to the accompanying drawings, in which:

FIG. 1 shows parts of a synchronous generator;
FIG. 2 shows parts of a load angle measurement apparatus;
FIG. 3 shows parts of a synchronous generator with a load angle measurement unit; and
FIG. 4 shows parts of a load angle measurement apparatus.

FIG. 1 shows parts of a synchronous generator 1 with which the present invention may be used. Referring to FIG. 1, the generator includes a main machine 32 comprising a main rotor 2 and a main stator 3. The main rotor 2 is located on a shaft 12 which is driven by a prime mover such as a diesel engine (not shown). The main rotor develops a magnetic field, so that rotation of the main rotor relative to the main stator causes an AC output to be generated in the main stator windings.

The main rotor 2 is magnetised by passing a DC current through the rotor windings. This DC current is generated by an exciter 34, which consists of exciter rotor 6, exciter stator 7, and rotating diodes 4. The exciter rotor 6 is mounted on the shaft 12, and rotation of the exciter rotor 6 relative to the exciter stator 7 generates an AC output in the exciter rotor windings. This AC output is converted to DC by the rotating diodes 4, and the DC output of the rotating diodes fed to the main rotor 2.

In the arrangement of FIG. 1, the exciter 34 is itself excited by means of a permanent magnet generator (PMG) 36 consisting of a PMG rotor 8 and a PMG stator 9. The PMG rotor 8 is also mounted on the shaft 12, and rotation of the PMG rotor relative to the PMG stator causes an AC output to be generated in the PMG stator.

This output is fed to the exciter stator 7 via the Automatic Voltage Regulator (AVR) 10. The AVR 10 responds to a voltage sensing signal derived from the main stator windings, and controls the level of excitation supplied to the exciter stator 7 from the PMG stator 9. By controlling the relatively low power which is fed to the exciter stator, control of the high power in the main rotor is achieved through the rectified output of the exciter rotor.

The synchronous generator shown in FIG. 1 may be connected to the mains utility supply network. In this case, the AVR 10 may include a reactive current regulator. If the network voltage increases, the generator may be transiently under-excited until the AVR 10 has corrected for the change. If the generator excitation becomes too weak for a particular kW loading condition, the magnetic flux in the main rotor will not develop the required torque to maintain the generator in synchronism, and the rotor will start to pole slip.

In a synchronous generator the load angle (the angular displacement of the rotor from the no-load position) may be used as a measure of how close the generator is to pole slipping. In the generator of FIG. 1, the AC voltage produced in the PMG stator is derived directly from the rotating magnets fixed to the shaft. In an embodiment of the present invention, the voltage in the PMG stator is used as a rotor position sensor. The phase of the PMG AC voltage is compared to that of the generator main stator voltage to obtain a measure of load angle. An alarm may be given when a safe limit has been exceeded.

FIG. 2 shows parts of a load angle measurement apparatus in accordance with an embodiment of the present invention. The apparatus may be part of the AVR 10 shown in FIG. 1, or it may be a separate unit.

Referring to FIG. 2, the AC waveforms produced by the PMG stator 9 and the main stator 3 are fed to respective conditioning circuits 14, 16. The PMG may also provide power to the power supply 18, which provides power for the various components. The conditioning circuits 14, 16 filter the AC waveforms and convert them to square waves. The PMG frequency is often a multiple of the generator frequency, and so conditioning circuit 14 may also divide the frequency of the PMG waveform, if required, so that it is the same frequency as the generator waveform signal. Phase shifting may also be carried out so that the PMG and generator waveform signals are in phase when the generator is at a no-load condition.

The square waves on the outputs of the conditioning circuits 14, 16 are connected to a load angle measurement circuit 20. The load angle measurement circuit measures the difference in phase between the PMG and generator signals, and produces an output signal representing load angle. The load angle signal is applied to an angle limit detection circuit 22, along with a reference value from a reference signal generator 24. If the load angle signal exceeds the reference value, then an alarm signal is generated by alarm circuit 26. The alarm signal is fed via remote signalling circuit 28 to the generating set control system so that the appropriate action can be taken. For example, if a pole slipping event is detected, a generator circuit breaker may be opened immediately to prevent damage to the rotor and rotating rectifier components.

A time delay may be included before the alarm signal is activated if desired. The angle limit detector 22 could be arranged to include several levels of detection so that warning signals are provided before a critical condition has been reached.

The above apparatus could be included in the design of the Automatic Voltage Regulator (AVR) used on the generator or could be a stand alone device. The benefits of this system are fast acting and wide operating voltage range as the power for the detection circuitry may come from the PMG or engine battery system, and is less affected by large voltage excursions on the mains utility supply than present methods of detection. The low component count and use of existing excitation components allow a low cost solution.

FIG. 3 shows parts of a synchronous generator with a load angle measurement unit. In FIG. 3, a load angle measurement unit 38 is shown as a separate unit, although it could be part of the AVR 10. The load angle measurement unit may have the components shown in FIG. 2. Also shown in FIG. 3 are a circuit breaker 40 connected to the output of the generator, and an alarm 42.

In the arrangement of FIG. 3, if the load angle measurement unit 38 detects or anticipates a pole slipping event, the circuit breaker 40 is opened immediately to prevent damage to the generator. The alarm 42 is used to indicate to the operator that pole slip is occurring, or is about to occur. For example, the alarm may give a visual and/or audible alarm to the operator.

In other embodiments, a current limiter may be provided for limiting the current drawn from the generator in dependence on the measure of load angle.

FIG. 4 shows parts of a load angle measurement apparatus in accordance with another embodiment. As in the FIG. 2 embodiment, the AC waveforms produced by the PMG stator 9 and the main stator 3 are fed to respective conditioning circuits 14, 16, and optionally to power supply 18. The outputs of the conditioning circuits 14, 16 are connected to a load angle measurement circuit 20. These circuits operate in the way described above with reference to FIG. 2.

In the embodiment of FIG. 4, the signal representing load angle at the output of the load angle measurement circuit 20 is fed to rate of change circuit 44. The rate of change circuit 44 measures a rate of change of the load angle. For example, the rate of change circuit may differentiate the load angle signal, or measure the difference in the load angle signal at two or more points. A signal representing the rate of change of the load angle is fed to pole slip anticipation circuit 46.

The pole slip anticipation circuit 46 is arranged to anticipate a possible pole slip condition based on the rate of change of the load angle. For example, if the rate of change of the load angle is above a predetermined threshold, this may indicate an impending pole slip condition. A signal indicating a potential pole slip condition is fed to alarm circuit 26 and remote signalling circuit 28, in the same way as the FIG. 2 embodiment.

In the arrangement of FIG. 4, the pole slip anticipation circuit 46 may also take into account the absolute value of the load angle, as indicated by the dashed line. For example, the pole slip anticipation circuit may determine that pole slip is imminent if the rate of change of load angle is above a threshold, and the absolute value of the load angle is above a threshold.

Various different thresholds could be set, and various combinations of threshold could be used to detect possible pole slip in different ways. For example, if the rate of change of load angle is high, this may indicate that pole slip is likely whatever the absolute value of the load angle. On the other hand, if the change of load angle is low, this may only be of concern if the absolute value of load angle is already high.

Various different thresholds could also be set to indicate different levels of likelihood of pole slip.

In any of the embodiments described above, the various parts of the load angle measurement apparatus may be implemented as hardware units, or as software modules running on a processor, or as any combination thereof.

The invention claimed is:

1. A pole slip indicator for a synchronous generator, the synchronous generator comprising a main machine, an exciter for exciting the main machine, and a permanent magnet machine for exciting the exciter, the pole slip indicator comprising:
   first sensor arranged to sense a waveform produced by the permanent magnet machine;
   a second sensor arranged to sense a waveform produced by the main machine;
   comparator circuit arranged to compare the phase of the waveform produced by the permanent magnet machine with the phase of the waveform produced by the main machine to produce a signal representing a measure of load angle; and
   a pole slip indication unit which provides an indication of how close the generator is to pole slip based on the measure of load angle.

2. A pole slip indicator according to claim 1, further comprising a conditioning circuit which changes the frequency of at least one of the waveform produced by the permanent magnet machine and the waveform produced by the main machine.

3. A pole slip indicator according to claim 1, further comprising a conditioning circuit which converts at least one of the waveform produced by the permanent magnet machine and the waveform produced by the main machine to a waveform having at least one of a faster rise time and a faster fall time.

4. A pole slip indicator according to claim 1, further comprising a conditioning circuit which converts at least one of the waveform produced by the permanent magnet machine and the waveform produced by the main machine to a waveform which is substantially a square wave.

5. A pole slip indicator according to claim 1, further comprising a phase shift circuit which phase shifts at least one of the waveform produced by the permanent magnet machine and the waveform produced by the main machine so that the waveforms have a predetermined phase relationship when the generator is at a no-load condition.

6. A pole slip indicator according to claim 1, wherein the pole slip indication unit produces an output signal when the measure of load angle exceeds a predetermined threshold.

7. A pole slip indicator according to claim 1, wherein the pole slip indication unit is arranged to anticipate pole slip based on the measure of load angle, and to output a signal indicating potential pole slip.

8. A pole slip indicator according to claim 7, wherein the pole slip indication unit is arranged to determine a change in the load angle, and to output a signal indicating potential pole slip if the change in the load angle is above a threshold.

9. A pole slip indicator according to claim 8, wherein the pole slip indication unit is arranged to determine a rate of change of the load angle.

10. A pole slip indicator according to claim 1, further comprising an isolating unit which at least partially isolates the generator from a load or a supply network in dependence on at least one of the measure of load angle and signal indicating potential pole slip.

11. A pole slip indicator according to claim 1, further comprising a current limiter which limits the current drawn from the generator in dependence on at least one of the measure of load angle and signal indicating potential pole slip.

12. A synchronous generator comprising:
   a main machine;
   an exciter for exciting the main machine;
   a permanent magnet machine for exciting the exciter; and
   a pole slip indicator comprising:
      a first sensor arranged to sense a waveform produced by the permanent magnet machine;
      a second sensor arranged to sense a waveform produced by the main machine;
      a comparator circuit arranged to compare the phase of the waveform produced by the permanent magnet machine with the phase of the waveform produced by the main machine to produce a signal representing a measure of load angle; and
      a pole slip indication unit which provides an indication of how close the generator is to pole slip based on the measure of load angle.

13. Apparatus which provides a warning of pole slip in a synchronous generator, the synchronous generator comprising a main machine, an exciter for exciting the main machine, and a permanent magnet machine for exciting the exciter, the apparatus comprising:
   a first sensor which senses a waveform produced by the permanent magnet machine;
   a second sensor which senses a waveform produced by the main machine;
   a comparator circuit which compares the phase of the waveform produced by the permanent magnet machine with the phase of the waveform produced by the main machine; and
   a pole slip indicator circuit which provides a warning of pole slip based on an output of the comparator circuit.

14. A method of providing an indication of pole slip in a synchronous generator, the synchronous generator comprising a main machine, an exciter for exciting the main machine, and a permanent magnet machine for exciting the exciter, the method comprising the steps of:
   sensing a waveform produced by the permanent magnet machine;
   sensing a waveform produced by the main machine;
   comparing the phase of the waveform produced by the permanent magnet machine with the phase of the waveform produced by the main machine to produce a signal representing a measure of load angle; and
   providing an indication of how close the generator is to pole slip based on the measure of load angle.

\* \* \* \* \*